United States Patent [19]

Suh et al.

[11] Patent Number: 5,106,882

[45] Date of Patent: Apr. 21, 1992

[54] INSULATING ALKENYL AROMATIC POLYMER FOAM

[75] Inventors: Kyung W. Suh, Granville; Jerry L. Severson, Newark, both of Ohio

[73] Assignee: The Dow Chemical Company, Midland, Mich.

[21] Appl. No.: 678,272

[22] PCT Filed: Oct. 17, 1989

[86] PCT No.: PCT/US89/04639

§ 371 Date: May 28, 1991

§ 102(e) Date: May 28, 1991

[51] Int. Cl.⁵ .............................................. C08J 9/14
[52] U.S. Cl. ...................................... 521/79; 264/53; 264/DIG. 5; 521/98; 521/146; 521/147; 521/910; 521/131
[58] Field of Search ............ 521/79, 98, 146, 147, 521/910, 131; 264/53, DIG. 5

[56] References Cited

U.S. PATENT DOCUMENTS

| | | | |
|---|---|---|---|
| 3,960,792 | 6/1976 | Nakamura | 521/79 |
| 4,438,224 | 3/1984 | Suh et al. | 521/146 |
| 4,636,527 | 1/1987 | Suh et al. | 521/79 |
| 4,801,484 | 1/1989 | Yao et al. | 521/143 |
| 4,810,570 | 3/1989 | Rutten et al. | 521/143 |
| 4,824,720 | 4/1989 | Malone | 521/143 |
| 4,931,484 | 6/1990 | Hovis et al. | 521/143 |
| 4,990,542 | 2/1991 | Motani et al. | 521/143 |

FOREIGN PATENT DOCUMENTS 1086450  9/1980  Canada .

Primary Examiner—Morton Foelak

[57] ABSTRACT

Dimensionally stable alkenyl aromatic thermoplastic synthetic resinous elongate foam bodies having closed noninterconnecting gas-containing cells having an average cell size of 0.05 to 2.0 millimeters, a minimum cross-sectional dimension of at least 0.25 inch, a cross-sectional area of at least 8 square inches, a water vapor permeability not greater than 1.8 perm inch, a density of from 1.0 to 5.0 pounds per cubic foot (16 to 80 g/l), and an absolute dimensional stability of less than 4 percent in any direction when measured by the test designated ASTM D2126/C578 are prepared using 1,1-difluoro-1-chloroethane as a blowing agent and extruding at controlled temperatures.

11 Claims, No Drawings

INSULATING ALKENYL AROMATIC POLYMER FOAM

This invention relates to a process for making dimensionally stable insulating alkenyl aromatic polymer foam extruded in large cross sections employing a blowing agent (or mixture) that is solely 1,1-difluoro-1-chloroethane (or more than 70 percent by weight 1,1-difluoro-1-chloroethane).

One major application for alkenyl aromatic, polymer foams (such as polystyrene) is in the field of thermal insulation. Desirably a styrene polymer foam for thermal insulation has an average cell size of less than 0.5 millimeters and excellent dimensional stability.

One manner in which the thermal insulation value of styrene polymer foams is increased is by the addition of certain fully-halogenated compounds, such as dichlorodifluoromethane, into the styrene polymer foam as a blowing/insulating agent. Such a compound, when contained in the cells of the extruded styrene polymer foam, increases the thermal insulation value.

It is extremely well known that dimensional stability is particularly important when the extruded styrene polymer foam is employed as thermal insulation in construction uses or is laminated to a cementitious layer. For most commercial applications regular rectangular forms are required and while a distorted shape can be cut into a rectangular form, considerable product is lost in cutting and must be discarded as scrap. Another consideration is that if an extruded styrene polymer foam product is not dimensionally stable, then the foamed polystyrene must be maintained in storage for a sufficient length of time until substantially all dimensional instability, such a shrinking, swelling, warping or bulging has stopped.

Still another important consideration is the choice of a blowing/insulating agent. Certain of these agents, particularly fully-halogenated compounds such as dichlorodifluoromethane, when released to the atmosphere upon extrusion of the styrene polymer foam or upon aging of the foam are believed to cause harm to the atmosphere. Thus, it is desirable to reduce or eliminate these fully-halogenated compounds Canadian Patent No. 1,086,450 refers to this problem and proposes a variety of low permeability, insulating/blowing agents, or mixtures of those agents, having a permeability through an alkenyl aromatic resinous polymer of not greater than 0.017 times the permeability of nitrogen through the body, a thermal conductivity of 0.07±20 percent British Thermal Units-inch per hour per square foot per degree Fahrenheit and having the following formula:

$R_1-CF_2-R_2$ wherein $R_1$ is a methyl, ethyl, chloromethyl, dichloromethyl, difluoromethyl, chlorofluoromethyl, fluoromethyl, or trifluoromethyl radical and $R_2$ is hydrogen or a chloro, fluoro, methyl or trifluoromethyl radical with the further characterization that the compound contain no more than 3 carbon atoms and if the compound contains as halogen only 2 fluorine atoms, the compound must have 3 carbons.

However, in Table II of the Canadian patent, it can be seen that polystyrene foam prepared from certain blowing agents, particularly 1,1-difluoro-1-chloroethane, have a dimensional stability which is excessive. This is particularly noted in Example 16.

U.S. Pat. No. 3,960,792 teaches how to prepare a dimensionally stable expanded closed cell polystyrene foam body while employing as the fluid foaming agent a volatile material which has a diffusion rate through the polystyrene resin about 0.75 to 6 times the diffusion rate of air through polystyrene resin with the foaming agent being a mixture of at least two compounds having carbon chemically combined therein.

U.S. Pat. No. 4,636,527 teaches how to prepare an expanded closed cell polystyrene foam body while employing as the fluid foaming agent a mixture of carbon dioxide and ethyl chloride. Optionally dichlorodifluoromethane, 1,1-difluoro-1-chloroethane and mixtures thereof may also be included as part of the blowing agent mixture.

There is a need to be able to produce a dimensionally stable extruded polystyrene foam body with a non-fully halogenated insulating/blowing agent.

More particularly there is a need to be able to produce a dimensionally stable extruded polystyrene foam body with 1,1-difluoro-1-chloroethane as an insulating/blowing agent.

Broadly, the present invention is a process for making an alkenyl aromatic thermoplastic synthetic resinous elongate foam body having a machine direction and a transverse direction and defining a plurality of closed noninterconnecting gas-containing cells therein, the cells having an average cell size of from 0.05 to 2.0 millimeters when measured across a minimum cross-sectional dimension of the body, the body being of a generally uniform cellular structure without substantial discontinuities, the body having a cross-sectional area of at least 8 square inches (51.6 square centimeters) with a minimum cross-sectional dimension of at least 0.25 inch (6.35 millimeters), a water vapor permeability not greater than 1.8 perm inch (3.02 metric perm centimeters) a density of from 1.0 to 5.0 pounds per cubic foot (16 to 50 kilograms/cubic meter) with the further limitation that the cells of the freshly made foam contain, as gas, more than 70 percent by weight 1,1-difluoro-1-chloroethane and characterized in that any change in dimension in any direction is four percent or less when measured by the test designated ASTM D2126/C578 and further characterized in that (a) the foam body is extruded at a die temperature of at least 115° C. to prepare products having a density of from 1.0 to 2.5 pounds per cubic foot (16 to 38 g/l) and (b) the body is extruded at temperatures of no more than 118° C. to prepare products having a density of from 2.5 to 5.0 pounds per cubic foot (38 to 80 g/l).

It is preferred that the alkenyl aromatic thermoplastic synthetic resin is polystyrene. It is often preferred that the density of the foam is from 2.4 to 3.5 pounds per cubic foot (38 to 56 g/l).

It is often preferred that the blowing agent is 100 percent 1,1-difluoro-1-chloroethane.

It is preferred that the foam body is formed by extruding a gel of an intimate mixture of an alkenyl aromatic synthetic resin and at least one blowing agent at a temperature within a range from 95° to 140° C. and an external foaming pressure in a range from one tenth atmospheric to thrice atmospheric.

It is sometimes preferred the external foaming pressure is atmospheric.

It is sometimes preferred the external foaming pressure is subatmospheric.

It is sometimes preferred the external foaming pressure is superatmospheric.

It is sometimes preferred the external foaming pressure is in the range from 0.4 to 0.6 atmospheres and the extrusion temperature is in a range from 112° to 140° C.

It is sometimes preferred the extrusion temperature is in a range from 120° C. to 135° C. and the density of the foam is in a range from 1.0 to 2.5 pounds per cubic foot (16 to 38 g/l).

To make these alkenyl aromatic thermoplastic synthetic resinous elongate foam bodies at densities of 1.0 to 2.4 pounds per cubic foot (16 to 38 kilograms/cubic meter) the extrusion of the alkenyl aromatic thermoplastic synthetic resinous elongate foam body must be at 115° C. or greater.

To make these alkenyl aromatic thermoplastic synthetic resinous elongate foam bodies at densities of 2.4 to 5.0 pounds per cubic foot (38 to 80 kilograms/cubic meter) the extrusion of the alkenyl aromatic thermoplastic synthetic resinous elongate foam body must be at 118° C. or less.

The volatile fluid foaming agents used to prepare the foams of the present invention are those having at least 70 percent by weight 1,1-difluoro-1-chloroethane based on total blowing agent mixture weight. Preferably the blowing agent is 100 percent 1,1-difluoro-1-chloroethane (HCFC-142b). When it is not 100 percent, any remaining part of the blowing agent mixture can be any other chemical or physical blowing agent. Preferably the remaining part of the blowing agent mixture is water ($H_2O$), 1 to 4 carbon aliphatic hydrocarbons, such as ethane, chlorodifluoromethane (HCFC-22), 1,2-difluoroethane (HCFC-152a), carbon dioxide ($CO_2$) (provided the carbon dioxide does not exceed about 6 weight percent), a chemical blowing agent mix of sodium bicarbonate and boric acid and mixtures of the above, including specifically $CO_2$ and $H_2O$, 1 to 4 carbon aliphatic hydrocarbons and $CO_2$ and a chemical blowing agent mix of sodium bicarbonate and boric acid and $CO_2$.

Advantageously the blowing agent contains at least 85 weight percent 1,1-difluoro-1-chloromethane and more advantageously at least 90 weight percent 1,1-difluoro-1-chloromethane.

Preferably the blowing agents and their mixtures (weight percent based on total blowing agent mixture weight) are as follows:
1. 100% HCFC-142b;
2. 94–100% HCFC-142b/0–6% $CO_2$;
3. 80–100% HCFC-142b/0–20 sodium bicarbonate (optionally including boric acid);
4. 80–100% HCFC-142b/0–20 $H_2O$;
5. 80–100% HCFC-142b/0–20 ($CO_2/H_2O$) (6% or less $CO_2$);
6. 80–100% HCFC-142b/0–20 ethane;
7. 80–100% HCFC-142b/0–30 ($CO_2$/ethane) (6% or less $CO_2$);
8. 80–100% HCFC-142b/0–20 HCFC-22, preferably 80–100% HCFC-142b/0–20 HCFC-22;
9. 80–100% HCFC-142b/0–20 HCFC-152a.

The term 'alkenyl aromatic synthetic resin' refers to a solid polymer of one or more polymerizable alkenyl aromatic compounds. The polymer or copolymer comprises in chemically combined form, at least 60 percent by weight of at least one alkenyl aromatic compound having the general formula

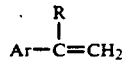

wherein Ar represents an aromatic hydrocarbon radical, or an aromatic halo-hydrocarbon radical of the benzene series, and R is hydrogen or the methyl radical. Examples of such alkenyl aromatic resins are the solid homopolymers of styrene, alpha-methylstyrene, o-methylstyrene, m-methylstyrene, p-methylstyrene, ar-ethylstyrene, ar-vinylstyrene, ar-chlorostyrene or ar-bromostyrene; and the solid copolymers of two or more of such alkenyl aromatic compounds with minor amounts of other readily polymerizable olefinic compounds such as, for example, methylmethacrylate, acrylonitrile, maleic anhydride, citraconic anhydride, itaconic anhydride, acrylic acid, and rubber reinforced (either natural or synthetic) styrene polymers.

The preparation of alkenyl aromatic resinous polymer foams in accordance with the present invention is most conveniently done in a known manner wherein the alkenyl aromatic synthetic resin is heat-plastified within an extruder. From the extruder the heat plastified resin is passed into a mixer, for example a rotary mixer wherein a studded rotor is enclosed within a housing which has a studded internal surface which intermeshes with the studs on the rotor. The heat-plastified resin and a volatile fluid foaming agent are fed into the inlet end of the mixer and discharged from the outlet end, the flow being in a generally axial direction. From the mixer, the gel passes through coolers and from the coolers to a die which extrudes a generally rectangular board.

In the preparation of foams in accordance with the present invention, it is often desirable to add a nucleating agent such as, for example talc, calcium silicate, or indigo to reduce the cell size.

EXAMPLES

The following examples in Tables 1 and 2 are prepared from polystyrene having a weight average molecular weight of about 200,000, calcium stearate (in amounts ranging from 0.00 to 0.08 weight parts per hundred based on resin weight) and talc (in amounts ranging from 0.00 to 0.08 weight parts per hundred based on resin weight).

These ingredients are added to an extruder and melted at a temperature of about 200° C. and a pressure of about 2000 psi (pounds per square inch) (140 kgs/cm$^2$)

This mixture of heat-plastified ingredients and the volatile blowing agent mixture (having at least about 70 weight percent by total blowing agent weight 1,1-difluoro-1-chloroethane) is then introduced into the inlet end of the mixer where the mixture is thoroughly mixed.

This mixture is then cooled to a foaming temperature, extruded through a slit die and expanded between a pair of substantially parallel plates to form a foam board having a rectangular cross-section of at least 8 square inches (51.6 square centimeters) with a minimum cross-sectional dimension of at least about 0.25 inch (6.35 millimeters).

For the dimensional stability testing the specimens in Tables 1 and 2 are prepared according to ASTM D-2126/C578 The dimensions of the specimens are approximately 4 inches by 4 inches by 1 inch (10×10×

2.54 cm). After conditioning the dimensions of the three principal axes (vertical, horizontal and extrusion) of the specimens are taken to the nearest ±0.1 percent.

The specimens are then exposed to a temperature of 70°±2° C. (158°±4° F.) and a relative humidity of 97±3 percent for a period of 7 days. After cooling at room temperature for 2 hours the dimensions of the three principal axes (vertical, horizontal and extrusion) of the specimens are again taken to the nearest ±0.1 percent. The percentage dimensional change in each of the three principal axes, positive or negative, is then determined to the nearest 0.1 percent.

TABLE 1

Effect of Foaming Temperature on Dimensional Stability and Density

| Blowing Agent Type and Amount (pph)[1] | Foaming Temperature °C.[1] | Density pcf[1] (g/l) | Cell Size mm[1] | Dimensional Stability %[2] V[1] | E[1] | H[1] |
|---|---|---|---|---|---|---|
| (12) HCFC-142b | 126 | 2.33 (37) | 1.32 | 1.0 | 1.5 | 1.3 |
| (12) HCFC-142b* | 126 | 2.63 (42) | 1.32 | −5.1 | 1.5 | 0.05 |
| (12) HCFC-142b* | 126 | 2.73 (44) | 1.25 | 9.3 | 2.1 | 0.2 |
| (16) HCFC-142b | 128 | 1.91 (31) | 1.28 | 2.4 | 1.3 | 1.7 |
| (16) HCFC-142b | 118 | 2.08 (33) | 0.58 | 1.8 | 2.5 | 3.2 |
| (16) HCFC-142b | 121 | 2.11 (34) | 0.25 | 1.9 | 0.5 | 3.0 |
| (16) HCFC-142b | 115 | 2.37 (38) | 0.6 | 2.4 | 1.0 | 3.3 |
| (14.5) HCFC-142b (0.4) $CO_2$ | 124 | 2.03 (32) | 0.21 | 1.1 | 1.1 | 1.7 |
| (14.5) HCFC-142b (0.4) $CO_2$ | 127 | 1.87 (30) | 0.19 | 1.1 | 2.2 | 1.0 |
| (13.0) HCFC-142b (2.3) HCFC-22 | 124 | 1.94 (31) | 1.08 | 1.6 | 1.9 | 2.0 |
| (13.0) HCFC-142b (2.3) HCFC-22 | 118 | 2.24 (86) | 1.65 | 1.2 | 1.4 | 2.2 |

*Not examples of the present invention.
[1]V = vertical direction; E = extrusion direction; H = horizontal direction; pph = weightparts per hundred weight parts of resin; °C. = degrees centigrade; pcf = pounds per cubic foot; mm = millimeters;
[2]As measured by ASTM D2126/C578

Normally it would be expected that the dimensional stability of the foam board would increase with an increase in density. However, looking at Table I it can be seen that the opposite is actually true. A density of about 2.4 pounds per cubic foot (38 g/l) or less produces a foam board having an absolute dimensional stability in any direction of bout four percent or less when measured by the test for dimensional stability designated ASTM D2126/C578. It should also be noted that all samples of the foam board had a foaming temperature at the die in excess of 115° C. or greater.

TABLE 2

Effect of Foaming Temperature on Dimensional Stability and Density

| Blowing Agent Type and Amount (pph)[1] | Foaming Temperature °C.[1] | Density pcf[1] (g/l) | Cell Size mm[1] | Dimensional Stability %[2] V[1] | E[1] | H[1] |
|---|---|---|---|---|---|---|
| (16) HCFC-142b | 110 | 2.64 (42) | 0.75 | 3.5 | 0.7 | 3.8 |
| (16) HCFC-142b | 110 | 2.62 (42) | 0.76 | 3.5 | 1.0 | 3.4 |
| (14.5) HCFC-142b (0.4) $CO_2$ | 118 | 2.64 (42) | 0.17 | 0.1 | 0.8 | 2.8 |
| (14.5) HCFC-142b (0.4) $CO_2$ | 118 | 2.95 (47) | 0.16 | −0.2 | 0.7 | 3.0 |

[1]V = vertical direction; E = extrusion direction; H = horizontal direction; pph = weightparts per hundred weight parts of resin; °C. = degrees centigrade; pcf = pounds per cubic foot; mm = millimeters;
[2]As measured by ASTM D2126/C578

As can be seen in Table 2 foam boards having a density greater than 2.4 pounds per cubic foot (38 g/l) and a dimensional stability in any direction of four percent or less when measured by the test for dimensional stability designated ASTM D2126/C578 can be produced by decreasing the foaming temperature to 118° C. or below.

The foregoing examples all involved external foaming pressures which were atmospheric. It is extremely well known that subatmospheric external foaming pressures can also be used in order to obtain foams of reduced density, particularly when the extrusion temperature at foaming is also slightly increased. It is also well known that the use of external foaming pressures that are superatmospheric permits the use of additional amount of blowing agent without foam collapse. It has been known for an extremely long time that cell size depends primarily on the difference in pressure between the pressure in the cells during cell enlargement and the external foaming pressure. Accordingly, similar foams can be obtained over quite a broad range of operating conditions.

We claim:

1. A process for making an alkenyl aromatic thermoplastic synthetic resinous elongate foam body having a machine direction and a transverse direction and defining a plurality of closed noninterconnecting gas-containing cells therein, the cells having an average cell size of from 0.05 to 2.0 millimeters when measured across a minimum cross-sectional dimension of the body, the body being of a generally uniform cellular structure without substantial discontinuities, the body having a cross-sectional area of at least 8 square inches (51.6 square centimeters) with a minimum cross-sectional dimension of at least 0.25 inch (6.35 millimeters), a water vapor permeability not greater than 1.8 perm inch (3.02 metric perm centimeters) a density of from 1.0 to 5.0 pounds per cubic foot (16 to 50 kilograms/cubic meter) with the further limitation that the cells of the freshly made foam contain, as gas, more than 70 percent by weight 1,1-difluoro-1-chloroethane and characterized in that any change in dimension in any direction is four percent or less when measured by the test designated ASTM D2126/C578 and further characterized in that (a) the foam body is extruded at a die temperature of at least 115° C. to prepare products having a density of from 1.0 to 2.5 pounds per cubic foot (16 to 38 g/l) and (b) the body is extruded at temperatures of no more than 118° C. to prepare products having a density of from 2.5 to 5.0 pounds per cubic foot (38 to 80 g/l).

2. Process of claim 1, characterized in that the alkenyl aromatic thermoplastic synthetic resin is polystyrene.

3. Process of claim 1 characterized in that the density is from 2.4 to 3.5 pounds per cubic foot (38 to 56 grams/liter).

4. Process of claim 3 characterized in that the alkenyl aromatic thermoplastic synthetic resin is polystyrene.

5. Process of any one of claim 1 to 3 characterized in that the blowing agent is 100 percent 1,1-difluoro-1-chloroethane.

6. Process of claim 1 wherein the foam body is formed by extruding a gel of an intimate mixture of an alkenyl aromatic synthetic resin and at least one blowing agent at a temperature within a range from 95° to 140° C. and an external foaming pressure within a range from one tenth atmospheric to thrice atmospheric.

7. Process of claim 6 wherein the external foaming pressure is atmospheric.

8. Process of claim 6 wherein the external foaming pressure is subatmospheric.

9. Process of claim 8 wherein the external foaming pressure is in the range from 0.4 to 0.6 atmospheres and the extrusion temperature is in a range from 112° to 140° C.

10. Process of claim 9 wherein the extrusion temperature is in a range from 120° C. to 135° C. and the density of the foam is in a range from 1.0 to 2.5 pounds per cubic foot (16 to 38 g/l).

11. Process of claim 6 wherein the external foaming pressure is superatmospheric.

* * * * *